(12) United States Patent
Kravets et al.

(10) Patent No.: US 10,380,397 B2
(45) Date of Patent: Aug. 13, 2019

(54) HALF-BRIDGE FINGEPRINT SENSING METHOD (71) Applicant: Cypress Semiconductor Corporation, San Jose, CA (US)

(72) Inventors: Igor Kravets, Lviv (UA); Roman Ogirko, Lviv (UA); Hans Klein, Pleasanton, CA (US); Oleksandr Hoshtanar, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 167 days.

(21) Appl. No.: 14/978,442

(22) Filed: Dec. 22, 2015

(65) Prior Publication Data

US 2017/0068835 A1 Mar. 9, 2017

Related U.S. Application Data (60) Provisional application No. 62/216,253, filed on Sep. 9, 2015, provisional application No. 62/216,241, filed on Sep. 9, 2015.

(51) Int. Cl.
*G06K 9/00* (2006.01)
(52) U.S. Cl.
CPC ................ *G06K 9/0002* (2013.01)
(58) Field of Classification Search
CPC ............... G06K 9/0002; G06K 9/40; G06F 3/041–047; G06F 2203/041–04113
See application file for complete search history.

(56) References Cited

U.S. PATENT DOCUMENTS

| 6,108,438 A * | 8/2000 | Bird ................. G06K 9/0002 250/556 |
| 7,460,697 B2 | 12/2008 | Erhart et al. |
| 7,735,721 B1 | 6/2010 | Ma et al. |
| 8,115,497 B2 * | 2/2012 | Gozzini ............. G06K 9/0002 324/661 |
| 8,736,577 B2 | 5/2014 | Land et al. |
| 8,786,295 B2 | 7/2014 | Chandra et al. |
| 8,874,396 B1 | 10/2014 | Olson et al. |
| 8,952,916 B2 | 2/2015 | Reynolds |
| 9,013,441 B2 | 4/2015 | Kremin et al. |
| 9,019,220 B1 | 4/2015 | Klein et al. |
| 2003/0035570 A1 * | 2/2003 | Benkley, III ....... G06K 9/00026 382/124 |

(Continued)

FOREIGN PATENT DOCUMENTS

WO 2014021918 A1 2/2014

OTHER PUBLICATIONS

Davison, Burk, "Techniques for Robust Touch Sensing Design," dated Nov. 29, 2012, 30 pages.

(Continued)

*Primary Examiner* — Roberto W Flores (57) ABSTRACT

Fingerprint detection circuits with common mode noise rejection are described. The Fingerprint detection circuit includes a half-bridge circuit coupled to a receive (RX) electrode of an array of fingerprint detection electrodes and to a buried capacitance that is unalterable by the presence of a conductive object on the array. The fingerprint detection circuit may also include a listener electrode configured to enable common mode noise rejection through a differential input stage of a low noise amplifier (LNA).

12 Claims, 7 Drawing Sheets

(56) References Cited

U.S. PATENT DOCUMENTS

| | | | |
|---|---|---|---|
| 2003/0035572 A1* | 2/2003 | Kalnitsky | G06F 3/044 382/124 |
| 2013/0009651 A1* | 1/2013 | Benkley, III | G01N 27/04 324/649 |
| 2013/0221993 A1 | 8/2013 | Ksondzyk et al. | |
| 2013/0265242 A1* | 10/2013 | Richards | G06F 3/0418 345/173 |
| 2014/0085252 A1* | 3/2014 | Hanssen | H03K 17/9622 345/174 |
| 2015/0022670 A1 | 1/2015 | Gozzini et al. | |
| 2015/0268783 A1 | 9/2015 | Yoon et al. | |
| 2016/0342265 A1* | 11/2016 | Geaghan | G06F 3/044 |

OTHER PUBLICATIONS

Mohamed Gamal, et al., "Concurrent Driving Method with Fast Scan Rate for Large Mutual Capacitance Touch Screens," Journal of Sensors, Apr. 2014, 7 pages.

Shruti H, et al. "Designing a Capacitive Sensing System for a Specific Application," Dec. 2011, 14 pages, Cypress Semiconductor Corporation, EE Times.

Srinivasagam, Kannan, et al., "Differentiating Noise from Real Touch—The Key to Robust Capacitive Sensing," Oct. 2010, 8 pages, Cypress Semiconductor Corporation, EE Times Design.

International Search Report for International Application No. PCT/US2016/050186 dated Sep. 27, 2016; 4 pages.

Written Opinion of the International Searching Authority for International Application No. PCT/US2016/05186 dated Sep. 27, 2016; 6 pages.

USPTO Advisory Action for U.S. Appl. No. 14/964,562 dated Apr. 10, 2017; 4 pages.

USPTO Applicant Initiated Interview Summary for U.S. Appl. No. 14/964,562 dated Apr. 5, 2017; 3 pages.

USPTO Non Final Rejection for Application No. 16/017,513 dated Jun. 25, 2019; 17 pages.

* cited by examiner

HALF-BRIDGE FINGERPRINT SENSING METHOD

RELATED APPLICATIONS

This patent application claims the benefit of U.S. Provisional Patent Application No. 62/216,241, filed Sep. 9, 2015, and 62/216,253, filed Sep. 9, 2015, which are each incorporated by reference herein, in their entirety.

TECHNICAL FIELD

The present disclosure relates generally to fingerprint sensing, and more particularly to the construction and use of a fingerprint sensing array.

BACKGROUND

User devices store various types of information and allow access to additional information through their connection to the internet and databases stored thereon. Gaining unauthorized access to a user's device may provide access to confidential information about that user that could be used to do harm, steal identity, or commit other types of fraud.

Biometric authentication is one method by which the owner of a device may ensure that their information remains private when necessary and that access to information and systems remains proprietary.

SUMMARY

A differential capacitance measurement circuit is disclosed. The differential capacitance measurement circuit may comprise a half-bridge circuit. The half-bridge circuit may include a first mutual capacitor formed between a row electrode and a column electrode of a array and a second mutual capacitor that is buried, or not alterable by a user. The first mutual capacitor may be driven with a first signal and the second mutual capacitor may be driven with a signal that is complementary to the first signal. The capacitance values of the first mutual capacitor and the second mutual capacitor may be substantially equal such that the half-bridge circuit is balanced, or matched at a shared node between the first and second mutual capacitors. The shared node between the first and second mutual capacitances may be coupled to a differential amplifier at a first input. A listener electrode may be coupled to a the differential amplifier at a second input. In one embodiment, the listener electrodes may be configured to provide enable mode noise rejection with the differential input stage of the differential amplifier.

A method for providing a digital representation of a capacitance between a row electrode and a column electrode is described. The method may include receiving a first signal on a node coupled to a first input of an amplifier and a second signal on a the node coupled to the first input of the amplifier. The first signal may be derived from a first transmit (TX) signal and a capacitance between a row electrode and a column electrode. The second signal may be derived from a second TX signal that is complementary to the first signal and a capacitance between two buried electrodes. Buried electrodes may be disposed such that a mutual capacitance between them cannot be altered by the presence of a conductive object on the row and column electrode. The method may include receiving a third signal on a listener electrode coupled to a second input of the amplifier. The method may also include converting an output of the amplifier to a digital value representative of the capacitance between the row electrode and the column electrode.

A fingerprint detection array is described, wherein the fingerprint detection array includes a plurality of transmit (TX) electrodes disposed along a first axis and a plurality of receive (RX) electrodes disposed along a second axis. The fingerprint detection array may include at least one RX electrode that is split into two portions that are galvanically isolated from each other. The portions of the split RX electrodes may be configured to function as a listener electrode, alone or in combination with other portions of other portions of split RX electrodes. The listener electrode comprised of the one or more portions of split RX electrodes may be coupled to an input of a differential low noise amplifier (LNA). Another input of the differential LNA may be coupled to a receive electrode. In one embodiment, a common mode noise detected on the one or more portions of split RX electrodes may be rejected through the differential input stage of the differential LNA.

DETAILED DESCRIPTION

In the following description, for purposes of explanation, numerous specific details are set forth in order to provide a thorough understanding of the embodiments of the present invention discussed herein. It will be evident, however, to one skilled in the art that these and other embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

For simplicity and clarity of illustration, reference numerals may be repeated among the figures to indicate corresponding or analogous elements. Numerous details are set forth to provide an understanding of the embodiments described herein. The examples may be practiced without these details. In other instances, well-known methods, procedures, and components are not described in detail to avoid obscuring the examples described. The description is not to be considered as limited to the scope of the examples described herein.

Figure 1:
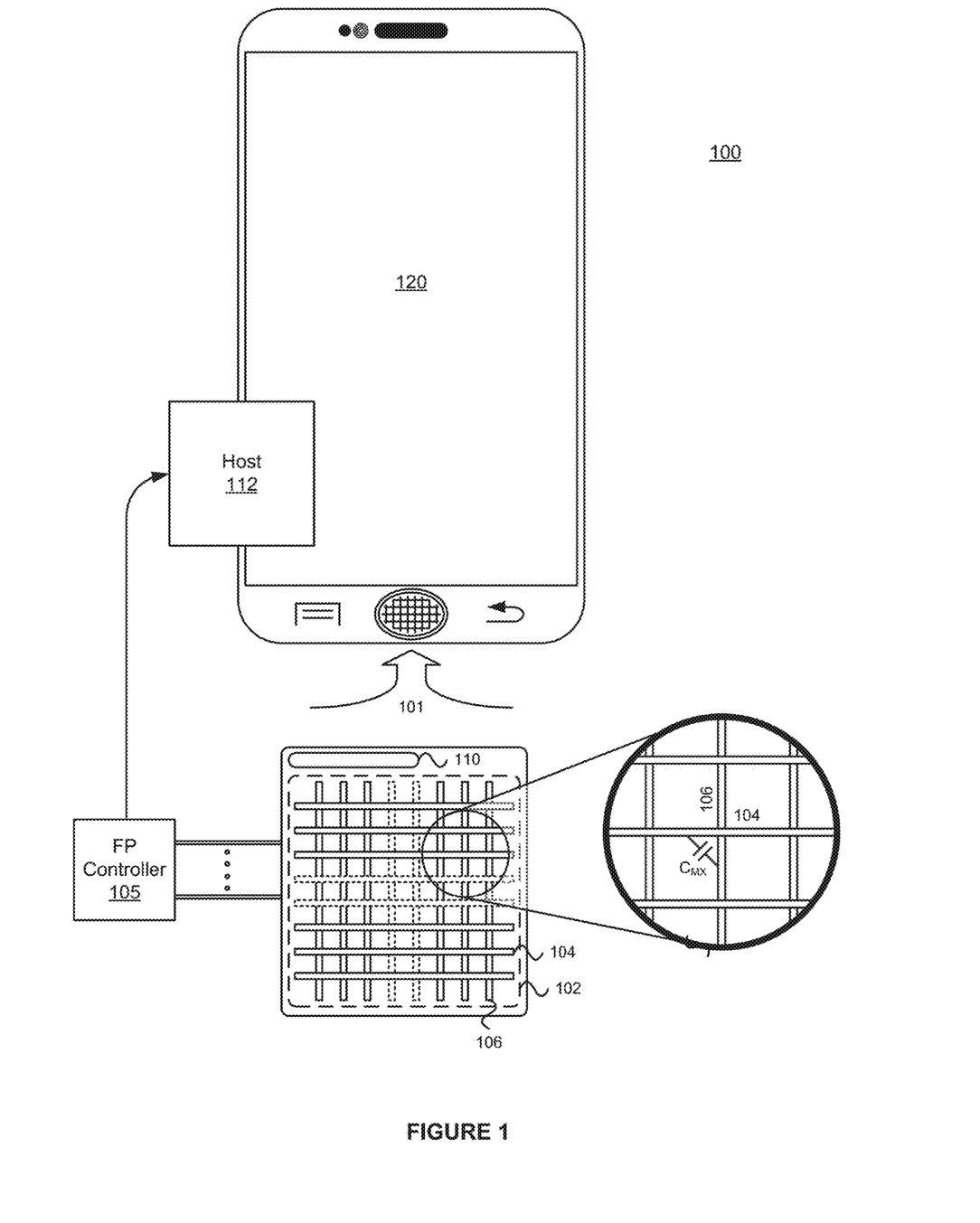
FIG. 1 illustrates a system including a fingerprint detection circuit, according to one embodiment.

FIG. 1 illustrates a system 100 with a fingerprint measurement circuit 101. Fingerprint measurement circuit 101 may include a number of electrodes arranged in an array 102 of row electrodes 104 and column electrodes 106, each coupled to a fingerprint (FP) controller 105. FIG. 1 illustrates eight row electrodes 104 and eight column electrodes 106, but there may be considerably more electrodes disposed along both axes. Depending on the size of the array, there may be dozens or hundreds of electrodes for each axis (row and column). The pitch of row electrodes 104 and column electrodes 106 may be small enough such that multiple rows or columns may be disposed within a space between ridges of a fingerprint or along a ridge of the fingerprint when a finger is in contact with array 102. The exact size and pitch of the electrodes may depend on the system design requirements.

Row electrodes 104 and column electrodes 106 may be disposed such that a mutual capacitance, $C_{MX}$, is formed between them. A value of $C_{MX}$ may then correspond to each intersection (of row electrodes 104 and column electrodes 106) of array 102. In the example of FIG. 1, a total of 64 intersections are illustrated. Consequently, there are 64 mutual capacitances. In an array with 75 row electrodes and 125 column electrodes, there may be 9,375 intersections, and therefore 9,375 mutual capacitances. In this embodiment, there would be 9,375 mutual capacitances that may be measured and used in fingerprint imaging. Electrodes (columns and rows) with dashed lines indicate that considerably more columns or rows may be disposed along either axis. While only eight electrodes (rows 104 and columns 106) are illustrated, this is merely for simplicity of description. One of ordinary skill in the art would understand that columns and rows that are dashed represent dozens or even hundreds of electrodes. The calculated values of $C_{MX}$ (or digital values representative of mutual capacitance $C_{MX}$) may be used by FP controller 105 or a host 112 to construct a fingerprint image for enrollment or validation, which may be used to unlock secure functions of system 100.

Fingerprint measurement circuit 101 may also include a listener electrode 110 coupled to FP controller 105 and configured to provide common mode noise for rejection for measurement of $C_{MX}$. Common mode noise may be coupled into a receive circuit like that used to measure a mutual capacitance at an intersection. The common mode noise may be coupled into the entire array 102 and may be sourced from system design elements, a user's finger, or some other global stimulus.

Figure 2:
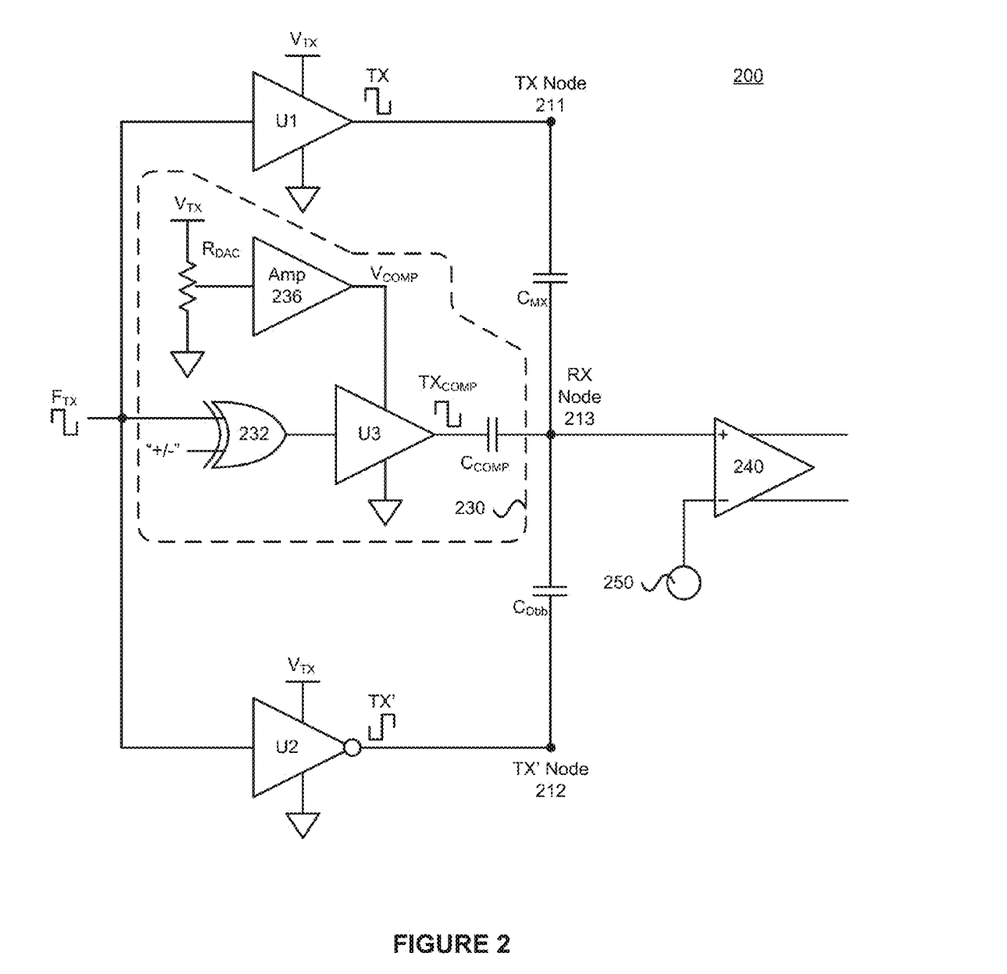
FIG. 2 illustrates a half-bridge differential capacitance measurement circuit, according to one embodiment.

FIG. 2 illustrates a half-bridge circuit 200 for measuring capacitance with suppressed common mode noise and imaging a fingerprint. Half-bridge circuit 200 may be disposed within FP controller 105 of FIG. 1. In another embodiment, half-bridge circuit 200 may be integrated into a host processor, the application processor of a computing device, or into a touch control circuit configured to detect the presence of conductive object on a touchscreen. A mutual capacitance, $C_{MX}$, between a row and column electrode (i.e. row electrode 104 and column electrode 106 of FIG. 1) is formed between a transmit (TX) node 211 and a receive (RX) node 213. TX node 211 may be driven with a signal, TX, derived from a master signal, $F_{TX}$, through buffer U1. Buffer U1 may be configured to receive master signal $F_{TX}$ and to provide a TX signal, TX, by switching the signal line between a source voltage, $V_{TX}$, and a ground potential. In other embodiments, different drive voltages and sink voltages for buffer U1 may be used. A signal derived on TX signal TX and mutual capacitance $C_{MX}$ may be induced (or received) in RX node 213 and coupled to the positive input of low noise amplifier (LNA) 240.

A buried capacitance, $C_{Dbb}$, may be formed by the capacitance of a buried receive (RX) electrode to a buried drive electrode. A buried capacitance may be a capacitance that may not be changed or altered by the placement of a conductive object, such as a finger, near the array (see array 102 of FIG. 1). $C_{Dbb}$ may be driven in a similar manner to $C_{MX}$, but with a complimentary TX signal, TX', on TX' node 212. A signal based on complimentary signal TX' and mutual capacitance $C_{DBB}$ may be received in RX node 213 and coupled to the positive input of low noise amplifier (LNA) 240. Complimentary signal TX' may be 180 degrees out of phase with signal TX. The physics of buried capacitance $C_{Dbb}$ may be similar to that of $C_{MX}$. That is, $C_{Dbb}$ may be a mutual capacitance formed between a buried RX electrode and a buried TX electrode. The drive signal for $C_{Dbb}$, complimentary signal TX', may be derived from $F_{TX}$ through buffer U2, just as was drive signal TX through buffer U1. In one embodiment, buffer U2 may invert $F_{TX}$, also switching the signal line between source voltage $V_{TX}$ and a ground potential. This scheme may provide a signal that is complimentary to TX. As with buffer U1, different drive voltages and sink voltages may be used with buffer U2.

RX node 213, shared between $C_{MX}$ and $C_{Dbb}$ may be coupled to a compensation circuit 230. Compensation circuit 230 may be used to provide offset signals (like an induced current from a compensation signal $TX_{COMP}$ and a compensation capacitor, $C_{COMP}$) to better match $C_{MX}$ and $C_{DBB}$ across half-bridge circuit 200. Compensation circuit 230 may include a modulator 232 with inputs from master signal $F_{TX}$ and a polarity signal "0/1" and an output to a buffer, U3. In one embodiment, modulator 232 may be an XOR logic element. Using an XOR logic element as the modulator may provide a half-bridge circuit (such as half-bridge circuit 200) that is insensitive to variations in $V_{TX}$. When polarity signal is logic 0, the $TX_{COMP}$ signal may be additive through $C_{COMP}$ to the signal on RX node 213 from TX node 211. When the polarity signal is logic 1, the $TX_{COMP}$ signal may be additive through $C_{COMP}$ to the signal on RX node 213 from TX' node 211. Buffer U3 may be configured to drive a compensation capacitor, $C_{COMP}$, with a compensation signal, $TX_{COMP}$. Compensation signal $TX_{COMP}$ may be generated by buffer U3 by using the output of modulator 232 to alternate the input of buffer U3 between a compensation voltage, $V_{COMP}$, and a ground potential. Thus, the alternating output of buffer U3 may be the compensation voltage, $V_{COMP}$, or a ground potential (or a fixed potential of either polarity). In one embodiment, $V_{COMP}$, may be provided by a regulated voltage divider, $R_{DAC}$, between a supply voltage and a ground potential. In various other embodiments, $V_{COMP}$ may be provided by external supply voltages, fixed supply voltages within a chip containing the half-bridge circuit, or through a digital-to-analog converter (DAC). Returning to the present embodiment, the supply voltage of regulated voltage divider $R_{DAC}$ may be $V_{TX}$, the same voltage by which the drive signal outputs of buffers U1 and U2 is provided. Regulated voltage divider $R_{DAC}$ may be set with a look-up-table (LUT) for each intersection to be measured (each mutual capacitance $C_{MX}$ for the intersections between row electrodes 104 and column electrodes 106 of FIG. 1). In various other embodiments, the supply voltages may be different than $V_{TX}$ and the ground potential may be another sink voltage. The output of regulated voltage divider $R_{DAC}$ may pass through a voltage follower, amplifier (Amp) 236, to provide the drive potential, $V_{COMP}$, to buffer U3.

Half-bridge circuit 200 may include a low noise amplifier (LNA) 240 with a positive input coupled to RX node 213. When the capacitance values of mutual capacitance $C_{MX}$ and buried capacitance $C_{Dbb}$ match, the bridge output is zero. LNA 240 may have a negative input coupled to a listener electrode 250. In one embodiment, the impedance of the listener electrode 250 equals the impedance of the RX electrode that is coupled to the positive input of LNA 240. As the listener electrode 210 and the RX electrodes (not shown, but represented by RX node 213 of $C_{MX}$) have matched impedances, a noise signal that is injected to the sensor by the presence of a conductive object (e.g., a finger) is present on both inputs of LNA 240. The noise is therefore common mode and may be suppressed by the differential input stage of LNA 240 through listener electrode 250.

In some embodiments, it may be difficult to match mutual capacitance $C_{MX}$ and buried capacitance $C_{Dbb}$. Variations in manufacturing tolerances and the decrease in the mutual capacitance when a conductive object (e.g., a finger) is placed on the sensing surface (by shunting away capacitance from the mutual capacitance between intersecting electrodes, as shown in FIG. 1) may make it too difficult to match mutual capacitance $C_{MX}$ and buried capacitance $C_{Dbb}$. Additionally, the reduction in the mutual capacitance of $C_{MX}$ due to the placement of a conductive object (e.g., a finger) on the sensing surface may not be repeatable. Changes in the placement of the conductive object or of the specific properties of the conductive object may change the value of $C_{MX}$ differently on successive placements of the conductive object on the sensing surface.

Compensation for variations in mutual capacitance $C_{MX}$ and buried capacitance $C_{Dbb}$ may be compensated for with compensation circuit 230. Modulator 232 of compensation circuit may be formed with an XOR element with inputs from $F_{TX}$ and a "1/0" signal, as discussed above (see FIG. 2). In one embodiment, compensation capacitance $C_{COMP}$ of compensation circuit 230 may be configured to provide enough signal to overcome the maximum imbalance between mutual capacitance $C_{MX}$ and buried capacitance $C_{Dbb}$. In another embodiment, compensation capacitance $C_{COMP}$ may be larger than the total possible error (tolerance) of mutual capacitance $C_{MX}$ and buried capacitance $C_{Dbb}$. That is, $C_{COMP}$ may be large enough to provide compensation for any mismatch in $C_{MX}$ and $C_{Dbb}$. Configuring compensation capacitance $C_{COMP}$ to cover the maximum difference between or the total possible error of mutual capacitance $C_{MX}$ and buried capacitance $C_{Dbb}$ allows compensation circuit 230 to provide compensation for operation of half-bridge circuit 200 regardless of operational conditions. This compensation may provide for a more finely balanced ("tuned") input to LNA 240 and a capacitance measurement for a change on mutual capacitance $C_{MX}$ (when a fingerprint ridge is present on the intersection of the selected row electrode 104 and column electrode 106 of FIG. 1).

FIG. 2 illustrates a half-bridge circuit 200 that is configured for a single transmit signal, meaning that only one mutual capacitance (i.e., $C_{MX}$) is driven at a time.

Figure 3:
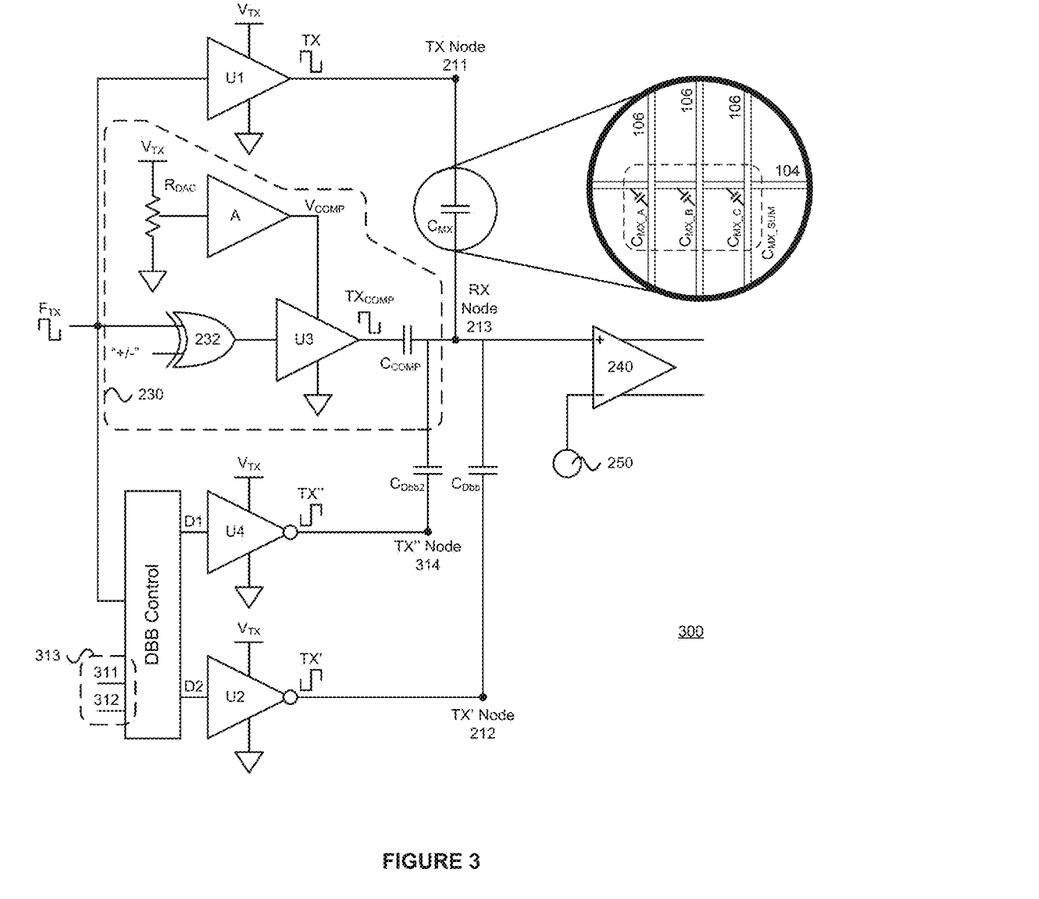
FIG. 3 illustrates a half-bridge differential capacitance measurement circuit with multiple buried drive electrodes, according to one embodiment.

FIG. 3 illustrates a half-bridge circuit 300 configured to drive multiple TX electrodes simultaneously. Such operation may be referred to as "multi-TX" operation. Half-bridge circuit 300 may use similar blocks as half-bridge circuit 200 of FIG. 2. However, an additional buffer, U4, may provide drive signal TX" at TX" node 314 to a second buried capacitance $C_{Dbb2}$ coupled between buffer U4 and RX node 213. Drive signal TX" may be complimentary to signal TX, and therefore 180 degrees out of phase. Half-bridge circuit 300 may include a DBB control circuit, 310, for buffers U2 and U4. DBB control circuit 310 may provide signal $F_{TX}$ to the inputs D1 and D2 of buffers U2 and U4, respectively, according to control inputs 311 and 312, collectively, control inputs 313. Control inputs 313 may be used to tune the output of buffers U2 and U4 to provide varying values of total capacitance through the multiple DBB capacitances, $C_{DBB}$ and $C_{DBB2}$. In one embodiment, buried capacitance $C_{Dbb2}$ may be three times as large as buried capacitance $C_{Dbb}$.

As multiple mutual capacitances ($C_{MX\_A}$-$C_{MX\_C}$) may be driven with multiple phases of a TX signal, the value of the sum of those multiple capacitances ($C_{MX\_A}$-$C_{MX\_C}$) must be balanced on the other side of half-bridge circuit 300. It is the combination of $C_{Dbb}$ and $C_{Dbb2}$ that may provide that balancing and matching for the input of LNA 240. Phase manipulation of the drive signals TX' and TX" on buried capacitances $C_{Dbb}$ and $C_{Dbb2}$ may provide more precise matching to the sum capacitance $C_{MX\_SUM}$ of the multiple driven TX electrodes 106. For the example embodiment of FIG. 3, using buried capacitances $C_{Dbb}$ and $C_{Dbb2}$ of half-bridge circuit 300, it may be possible to provide buried capacitance values between 1× and 4× $C_{Dbb}$. The signals for control inputs, the output of DBB control circuit 310, and the summed value of the buried capacitances is shown in Table 1.

TABLE 1

| Control Signal | 00 | 01 | 10 | 11 |
|---|---|---|---|---|
| D1 Input | $F_{TX}$ | /$F_{TX}$ | Z | $F_{TX}$ |
| D2 Input | Z | $F_{TX}$ | $F_{TX}$ | $F_{TX}$ |
| Total DBB Capacitance | 1 × $C_{Dbb}$ | 2 × $C_{Dbb}$ | 3 × $C_{Dbb}$ | 4 × $C_{Dbb}$ |

For Example, when DBB control circuit 310 outputs a "01" corresponding to outputs D1 and D2, respectively, the output of U2 (from D1) is the compliment of master signal $F_{TX}$ and the output of U4 (from D2) is master signal $F_{TX}$. The outputs have the frequency of master signal $F_{TX}$ (or the compliment), but the amplitude of the signal is given by the drive voltages (i.e., $V_{TX}$). If the capacitance value of $C_{DBB2}$ is three times as large as the capacitance of $C_{DBB}$, the total DBB capacitance on RX node 213 of FIG. 3 is given by:

$$\text{Total } DBB \text{ Capacitance} = C_{DBB2} - C_{DBB} = 2 * C_{DBB}.$$

While only a single mutual capacitance $C_{MX}$ is illustrated in FIG. 3, the mutual capacitance of half-bridge circuit 300 may be the sum of however many mutual capacitances are active in multi-TX operation. For example, if four drive electrodes (i.e., column electrodes 106 in FIG. 4) are driven and one receive electrode (i.e., row electrodes 104 in FIG. 1) is coupled to LNA 240, a total of four mutual capacitances may be coupled to the input of LNA 240. It may be necessary, therefore to match the sum of those four mutual capacitances through the combination of $C_{Dbb}$ capacitances.

Additionally, while only a pair of $C_{Dbb}$ capacitances are illustrated in FIG. 3, more $C_{Dbb}$ capacitances may be implemented with more buffers and corresponding mutual capacitances between those buffers and the RX node 213. Greater numbers of $C_{Dbb}$ capacitances may provide the ability to match the half-bridge capacitances of greater numbers of mutual capacitances, or with finer resolution, over and above the additional compensation resolution provided by compensation circuit 230.

Figure 4:
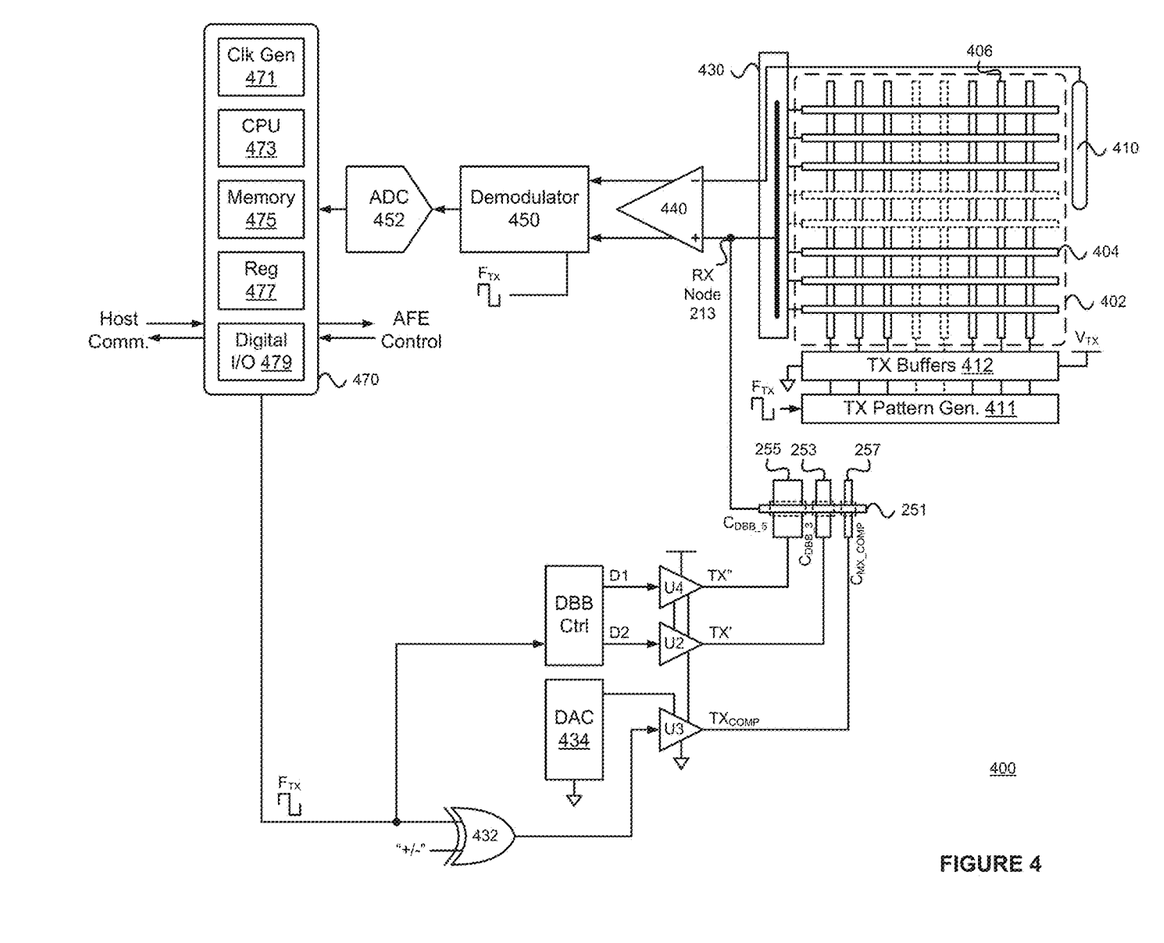
FIG. 4 illustrates a capacitance measurement system including a half-bridge differential capacitance measurement system, according to one embodiment.

FIG. 4 illustrates a system 400 including the half-bridge circuit 300 of FIG. 3. An array of electrodes 402 may include row electrodes 404 and column electrodes 406. Column electrodes 406 may be coupled to at least one TX buffer 408 (i.e., buffer U1 of FIGS. 2 and 3), which may be coupled to a TX pattern generator 412. TX pattern generator 412 may provide one or more TX patterns for the one or more column electrodes based on $F_{TX}$ (see FIGS. 2 and 3). While only eight electrodes are illustrated for each axis, one of ordinary skill in the art would understand that many more electrodes may be disposed in array 402 to provide sufficient size and resolution to a measurement circuit. As explained with above with regard to FIG. 1, dozens or hundreds of electrodes may be disposed on each axis to provide the necessary resolution. For a fingerprint measurement circuit, the pitch of the electrodes may be such that multiple electrodes are disposed for every ridge or valley of a fingerprint. For a touch controller, electrodes may be disposed such that multiple electrodes may be affected by the presence of a conductive object, such as a finger, on the array.

Row electrodes 404 of array 402 may form a mutual capacitance with column electrodes 406 (see $C_{MX}$ of FIGS. 1 and 2 and $C_{MX\_A}$-$C_{MX\_C}$ of FIG. 3). Row electrodes 404 may be coupled to a positive input of a low noise amplifier (LNA) 440 through an RX multiplexor 430 coupled to RX node 213. In one embodiment, RX multiplexor 430 may be configured to couple a single row electrode to the positive input of LNA 440 at a time. In another embodiment, multiple row electrodes may be coupled to the positive input of LNA 440 simultaneously. In still another embodiment, multiple LNAs may be coupled to RX multiplexor 430 to allow for individual and simultaneous measurement. In still another embodiment, RX multiplexor 430 may be comprised of several smaller multiplexors, either in parallel or in series, with various input and output configurations.

System 400 may also include a listener electrode 410 in close physical proximity to array 402. Listener electrode 410 may be coupled to the negative input of LNA 440 as described above with regard to FIGS. 2 and 3 (see listener electrode 250 and LNA 240).

To form the half-bridge in system 400, buffers and capacitances as described above in FIGS. 2 and 3 may be included. To form the buried capacitances $C_{Dbb}$ and $C_{Dbb2}$, a first buried electrode 251 may be coupled to the positive input of LNA 440 at RX node 213. A second buried electrode 253 and a third buried electrode 255 may be disposed in such a manner that a mutual capacitance ($C_{DBB\_3}$ and $C_{DBB\_5}$) is formed between each and the first buried electrode 251. The size of the buried capacitances for $C_{Dbb}$ and $C_{Dbb2}$ may be defined by the size of the buried electrodes and the space between them. Capacitance is given by:

$$C = \varepsilon_r \varepsilon_0 \frac{A}{d},$$

where C is capacitance in Farads, A is the area of overlap between the row and column electrodes of the buried capacitances, $\varepsilon_r$ is the relative static permittivity (dielectric constant) of the material between the row and column electrodes (plates of a capacitor), $\varepsilon_0$ is the electric constant, and d is the separation between the row and column electrodes (plates of the capacitor).

Buried electrodes 253 and 255 may be coupled to outputs of buffers U2 and U4, respectively (as illustrated in FIG. 3). Control of buffers U2 and U4 may be achieved with a DBB Control circuit 260, which is also described in detail with regard to FIG. 3 above. The drive scheme for providing the varied buried capacitance values to the positive input of LNA for matching with the mutual capacitance between row electrodes 404 and column electrodes 406 ($C_{MX}$ of FIGS. 2 and 3) is shown in Table 1, as an example.

To provide the compensation capacitance ($C_{COMP}$ of FIGS. 2 and 3), a compensation electrode 257 may be disposed such that a mutual capacitance is formed between compensation electrode 257 and first buried electrode 251. The output of buffer U3 (also illustrated in FIGS. 2 and 3) may be coupled to compensation electrode 257. Buffer U3 may be controlled my modulator 432 as illustrated in FIGS. 2 and 3 and provide a signal that is switched between ground and a compensation voltage, $V_{COMP}$, set by a digital-to-analog converter 434 ($R_{DAC}$ and amplifier A of FIGS. 2 and 3).

The output of LNA 440 may be coupled to a demodulation circuit ("demodulator") 450, which provides an analog to analog-to-digital converter (ADC) 452. Operation of demodulation circuit 450 and ADC 452 may be similar to that described in U.S. patent application Ser. No. 14/672,036, which is herein incorporated by reference.

Master signal $F_{TX}$, which may be used to provide the various drive frequencies to the capacitances of the half-bridge of system 400 may be provided by digital subsystem 470. Digital subsystem 470 may include a clock generator 471, which may provide a base clock frequency for drive and control functions. Digital subsystem 470 may also include CPU 473 which may be configured to execute functions and programs stored in memory 475 and to control registers ("Reg") 477 for circuit operation and interconnect control. Finally, digital subsystem 470 may include digital I/O 479 configurable for communication with a host controller or an AFE control circuit (not shown).

Figure 5:
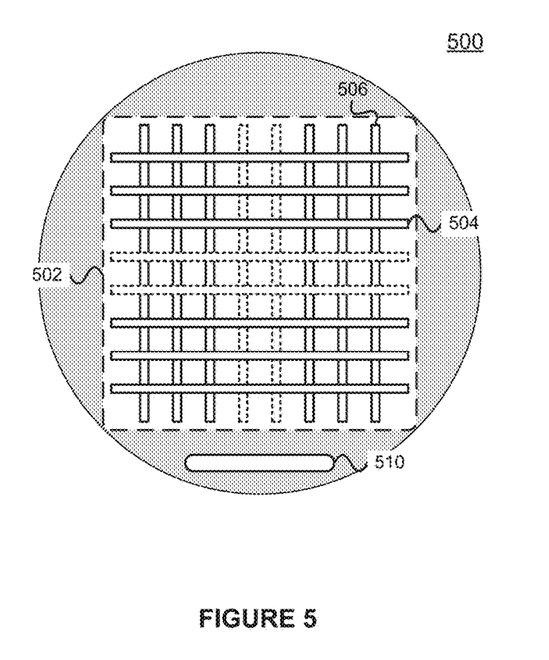
FIG. 5 illustrates one embodiment of an array of electrodes for use with a capacitance measurement system.

FIG. 5 illustrates one embodiment of a fingerprint sensor 500 including the electrodes similar to those illustrated in FIG. 4 (rows 404 and column 406 of array 402. Fingerprint sensor 500 may include an array of electrodes 502 which form the mutual capacitances (i.e., $C_{MX}$ of FIGS. 1 and 2 and $C_{MX\_A}$-$C_{MX\_C}$ of FIG. 3). Array 502 may include a plurality of row electrodes 504 and a plurality of column electrodes 506. While only eight electrodes are illustrated for each axis, this is merely for ease of description. A fingerprint measurement array may include dozens or hundreds of electrodes disposed as rows and columns. A mutual capacitance ($C_{MX}$ of FIG. 1) may be formed at the intersection of each row electrode 504 and column electrode 506. Row electrodes 504 and column electrodes 506 may be coupled to receive (RX) and drive (TX) circuitry, respectively, as shown and described in FIG. 4. Electrodes (columns and rows) with dashed lines indicate that considerably more columns or rows may be disposed along either axis. While only eight electrodes (rows 504 and columns 506) are illustrated, this is merely for simplicity of description. One of ordinary skill in the art would understand that columns and rows that are dashed represent dozens or even hundreds of electrodes.

A listener electrode 510 may be disposed in close proximity to array 502 and coupled to an input of an LNA (as illustrated in FIGS. 2 and 3). Listener electrode may be disposed such that contact with array 502 necessarily provides contact with listener electrode 510. Listener electrode 510 may be used to provide common mode noise rejection through differential inputs to an LNA.

Figure 6A:
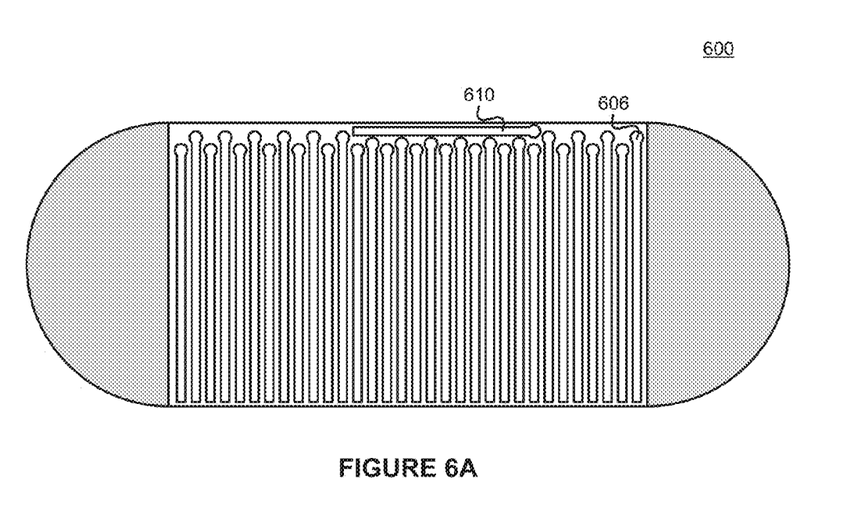
FIG. 6A illustrates one embodiment of a top-layer of a fingerprint detection interface with a listener electrode.

FIG. 6A illustrates one embodiment of a fingerprint sensor 600 including column electrodes similar to those illustrated in FIGS. 4 and 5 (see column electrodes 406 and 506). In one embodiment, column electrodes 606 may be coupled to the positive input of LNA 440 and the row electrodes (not shown for clarity of description) may be coupled to a plurality of TX buffers (412 of FIG. 4). Fingerprint sensor 600 may also include a listener electrode 610 disposed along an edge of fingerprint sensor 600. In one embodiment, listener electrode 610 may be constructed and disposed in such a way that any touch that may generate information sufficient for a fingerprint image (and subsequent decisions) necessarily contact listener electrode 610. In this embodiment, the common mode noise rejection provided by the listener electrode 610 through the differential input (i.e. LNA 240 of FIGS. 2 and 3). Differential input may be ensured since a finger will always be in contact with the listener electrode when fingerprint sensor 600 is active and capable of imaging a fingerprint.

Figure 6B:
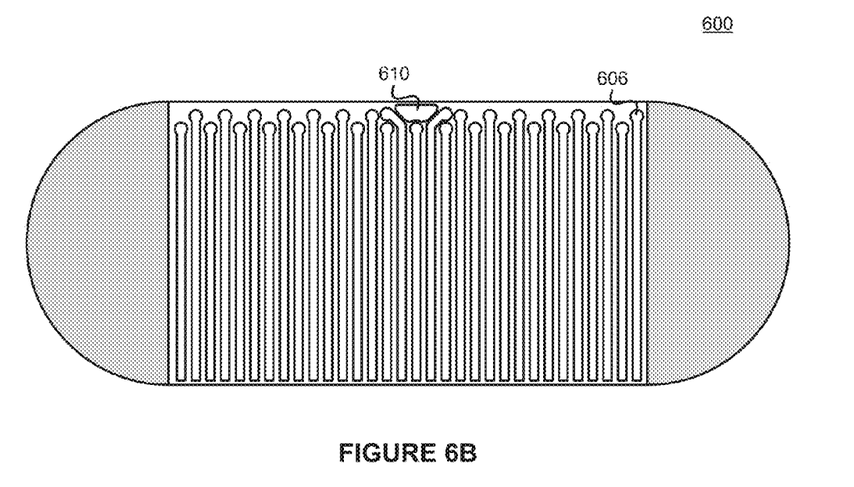
FIG. 6B illustrates one embodiment of a top-layer of a fingerprint detection interface with a listener electrode.

FIG. 6B illustrates another embodiment of a fingerprint sensor 601 including column electrodes 606 similar to those illustrated in FIGS. 4, 5, and 6A. In one embodiment, column electrodes 606 may be coupled to the positive input of LNA 440 (see FIG. 4) and the row electrodes (not shown for clarity of description) may be coupled to a plurality of TX buffers (412 of FIG. 4). Fingerprint sensor 601 may also include a listener electrode 611 disposed at an edge and near the center of fingerprint sensor 601. In one embodiment, listener electrode 611 may be constructed and disposed in such a way that any touch than may generate information sufficient for a fingerprint image (and subsequent biometric decisions) will contact listener electrode 610. In this embodiment, the common mode noise rejection provided by the listener electrode 610 is ensured since a finger will always be in contact with the listener electrode when fingerprint sensor 600 is active and capable of imaging a fingerprint.

Figure 7A:
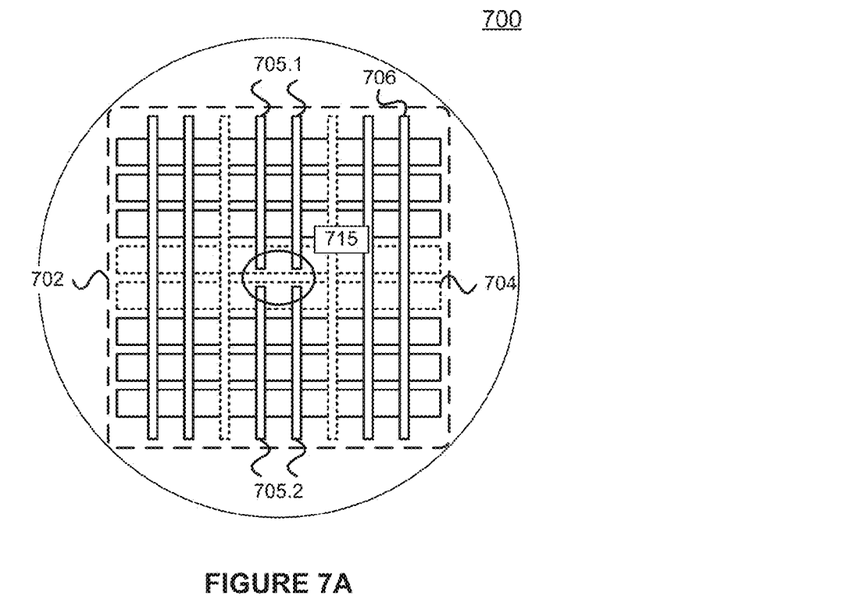
FIG. 7A illustrates one embodiment of an array of electrodes with a split receive electrode.

FIG. 7A illustrates one embodiment of a fingerprint sensor 700 with an array of electrodes 702. Array 702 may include a plurality of column electrodes 706 and a plurality of row electrodes 704. Row electrodes 704 may be coupled to drive circuitry as described in FIGS. 2-4. Column electrodes may be coupled to a LNA (similar to LNA 240 and 440 of FIGS. 2-4). Fingerprint sensor 700 may include at least one split electrode 705 (comprising split electrode halves 705.1 and 705.2) amongst the column electrodes 706 that may be coupled to the LNA (440 of FIG. 4). A split electrode 705 may be one that has a break 715 at some point between one side of the array and the other. While FIG. 7A shows that the break 715 is in the center of split electrode 705, break 715 may be positioned elsewhere along the axis of the split electrode 705. Break 715 may provide galvanic isolation to split electrode halves 705.1 and 705.2. Electrodes (columns and rows) with dashed lines indicate that considerably more columns or rows may be disposed along either axis. While only eight electrodes (rows 704 and columns 706) are illustrated, this is merely for simplicity of description. One of ordinary skill in the art would understand that columns and rows that are dashed represent dozens or even hundreds of electrodes.

Fingerprint sensor 700 may provide listener electrode functionality similar to that illustrated in FIGS. 6A and 6B, but with in-grid electrodes. This configuration may provide a greater probability of contact between a finger and the listener electrode when split electrode 705 is configured as such. When a row electrode coupled to a drive circuit, thus making it a drive electrode (TX electrode) under split electrode 705.1 is energized, the mutual capacitances between column electrodes 706 and the energized row electrode are measured. The mutual capacitance (as illustrated in FIG. 1) between split electrode 705.1 and the energized row electrode is measured as is the mutual capacitance of the rest of the column electrodes is measured. As the lower portion of split electrode 705 (705.2) does not intersect the energized row electrode, it may be used as the listener electrode, which is coupled to the negative input of a LNA (as shown in FIGS. 2-4). When rows intersecting the lower portion of split electrode 705 (705.2) are energized, the upper portion of split electrode 705 (705.1) may be used as the listener electrode. In the embodiment of FIG. 7A, the upper and lower portions of split electrode 705 (halves 705.1 and 705.2, respectively) may be half the area of a column electrode 706. To provide good matching with standard column electrodes 706, the adjacent portions of split electrode 705 may be coupled together in parallel to provide similar area to standard column electrodes. The noise coupling from a finger may then be balanced and provide the common noise rejection of the listener electrode (e.g. 250 of FIGS. 2 and 3, 410 of FIG. 4) with the differential input stage of LNA (e.g. 240 of FIGS. 2 and 3 and 440 of FIG. 4). Balanced capacitances may have similar capacitance values on either side of RX node 213 (of FIGS. 2 and 3).

Figure 7B:
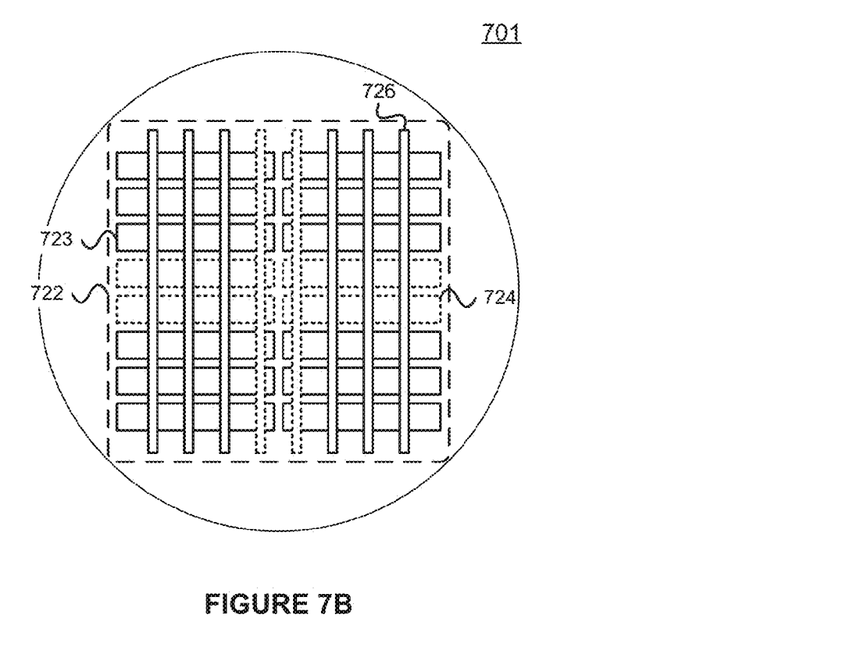
FIG. 7B illustrates one embodiment of an array of electrodes with split drive electrodes.

FIG. 7B illustrates one embodiment of a fingerprint sensor 701 with an array of electrodes 722. Array 722 may include a plurality of column electrodes 726 and a plurality of row electrodes 723 and 724. Row electrodes 723 and 724 may be coupled to drive circuitry as described in FIGS. 2-4. Column electrodes may be coupled to an LNA (similar to LNA 240 and 440 of FIGS. 2-4). Row electrodes 723 and 724 may each extend only partially across array 722, but the combination thereof my provide complete coverage of array 722. In the embodiment of fingerprint sensor 701, the mutual capacitances between column electrodes 726 and row electrodes 723 may be measured while the column electrodes 726 that intersect row electrodes 724 may be used similar to listener electrode 250 of FIGS. 2 and 3 and listener electrode 410 of FIG. 4. When row electrodes 724 are driven, the mutual capacitances between column electrodes 726 and row electrodes 724 may be measured, while the column electrodes 726 that intersect row electrodes 723 are used similar to listener electrode 250 of FIGS. 2 and 3 and listener electrode 410 of FIG. 4.

In the embodiment of FIG. 7B, twice as many drive pins of a drive circuit may be required to drive both sides of the row electrodes 723 and 724. However, column electrodes need not be coupled in parallel since they can be used in their entirety.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Figures and associated descriptions are directed to a device resembling a mobile handset with a touchscreen. However, one of ordinary skill in the art may apply the techniques described to larger touch-enabled consumer devices, such as tablets and personal computers. Additionally, the techniques described may be applied to smaller touch-enabled consumer devices, such as watches, GPS unit, media players, etc. Furthermore, although consumer electronics are referenced above, secure entry for various functions may be used in home automation applications (home entry, appliances, HVAC control, lighting, and media control) as well as automotive applications.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "integrating," "comparing," "balancing," "measuring," "performing," "accumulating," "controlling," "converting," "accumulating," "sampling," "storing," "coupling," "varying," "buffering," "applying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and circuits presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A differential capacitance measurement circuit comprising:
    a half-bridge circuit comprising a first mutual capacitor and a second mutual capacitor coupled to a first input of an amplifier;
    a listener electrode coupled to a second input of the amplifier; and
    a compensation circuit comprising:
        a modulator;
        a buffer coupled to an output of the modulator, the buffer configured to output a compensation signal; and
        a compensation capacitor coupled between an output of the buffer and the first input of the amplifier.

2. The differential capacitance measurement circuit of claim 1, wherein the buffer configured to output the compensation signal oscillates between a programmable voltage and a ground potential.

3. The differential capacitance measurement circuit of claim 1, further comprising:
a first buffer configured to provide a first transmit signal to a first node of the first mutual capacitor; and
a second buffer configured to provide a second transmit signal to a first node of the second mutual capacitor.

4. The differential capacitance measurement circuit of claim 3, wherein the first transmit signal and the second transmit signal are 180 degrees out of phase.

5. The differential capacitance measurement circuit of claim 3, further comprising:
a third buffer configured to provide a third transmit signal to a first node of a third mutual capacitance, wherein the third mutual capacitance is coupled to the first input of the amplifier; and
control logic for providing control signals to the second and third buffers.

6. The differential capacitance measurement circuit of claim 5, wherein the first and third transmit signal are in-phase.

7. The differential capacitance measurement circuit of claim 1, wherein the listener electrode is configured to couple to a conductive object and provide common mode noise rejection at the second input of the amplifier.

8. A method for measuring a capacitance comprising:
receiving a first signal derived from the capacitance on a receive node, the receive node coupled to a first input of an amplifier;
receiving a second signal derived from a buried capacitance on the receive node;
receiving a third signal on a listener electrode, the listener electrode coupled to a second input of the amplifier;
generating a differential output of the amplifier;
converting the differential output of the amplifier to a digital value representative of the capacitance; and
receiving a fourth signal on the receive node, wherein the fourth signal is configured to provide a compensation current to the input of the amplifier, and wherein the fourth signal is produced by a modulator coupled to a buffer, which is coupled to a compensation capacitor coupled to the first input of the amplifier.

9. The method of claim 8, wherein the first signal on the receive node is generated by a first transmit signal on a first node of a capacitor and received on a second node of the capacitor coupled to the receive node.

10. The method of claim 8, wherein the second signal on the receive node is generated by a second transmit signal on a first node of a capacitor and received on a second node of the capacitor coupled to the receive node.

11. The method of claim 10, wherein the capacitor is formed by a drive electrode and a buried receive electrode.

12. The method of claim 8, wherein the second signal is defined by control logic coupled to a buffer, the buffer comprising an output coupled to transmit electrode and the receive node coupled to a receive electrode.

* * * * *